United States Patent [19]
Lenoble

[11] Patent Number: 5,976,052
[45] Date of Patent: Nov. 2, 1999

[54] DIFFERENTIAL SELECTION AUTOMATIC GEAR CHANGE DEVICE FOR PEDAL VEHICLES

[76] Inventor: Jean-Paul Lenoble, 150, avenue de Wagram, Paris, France, 75017

[21] Appl. No.: 08/696,847
[22] PCT Filed: Sep. 12, 1995
[86] PCT No.: PCT/FR95/01169
   § 371 Date: Aug. 29, 1996
   § 102(e) Date: Aug. 29, 1996
[87] PCT Pub. No.: WO96/08405
   PCT Pub. Date: Mar. 21, 1996

[30] Foreign Application Priority Data

Sep. 13, 1994 [FR] France .................................. 94 10887

[51] Int. Cl.$^6$ ............................ B62K 19/44; B62M 11/06
[52] U.S. Cl. ............................ 475/297; 475/338; 280/238
[58] Field of Search ................................ 475/297, 338, 475/341; 74/592.2; 280/231, 238, 261

[56] References Cited

U.S. PATENT DOCUMENTS 5,099,712   3/1992   Douglass .................................. 74/363

FOREIGN PATENT DOCUMENTS

| 830114 | 7/1938 | France . |
|---|---|---|
| 871145 | 4/1942 | France . |
| 907868 | 3/1946 | France . |
| WO 95/11156 | 4/1995 | WIPO . |

*Primary Examiner*—Khoi Q. Ta
*Attorney, Agent, or Firm*—Greenblum & Bernstein, P.L.C.

[57] ABSTRACT

The present invention is related to a compact automatic gear change device for a bicycle in which all of the sprocket wheels (1) and (2) mesh by means of an intermediate moving element (3) and are equipped with anti-reverse pawls automatically controlled by mechanical or electronic tachometers. A first device is a line gear cluster incorporated in a sealed housing and connecting the bottom bracket spindle to the wheel spindle by completely eliminating the drive chain. A second device is composed of coaxial sprocket wheels driven by three intermediate moving elements (3) positioned on the inside, whereas the starting teeth of the wheels (1) and (2), the pawls (4) and (5) and the tachometers are positioned on the outside. The assembly is housed in two sealed housings (44) and (46) that rotate over one another. This compact cylindrical device can be positioned on the wheel or on the bottom bracket with a drive chain.

15 Claims, 7 Drawing Sheets

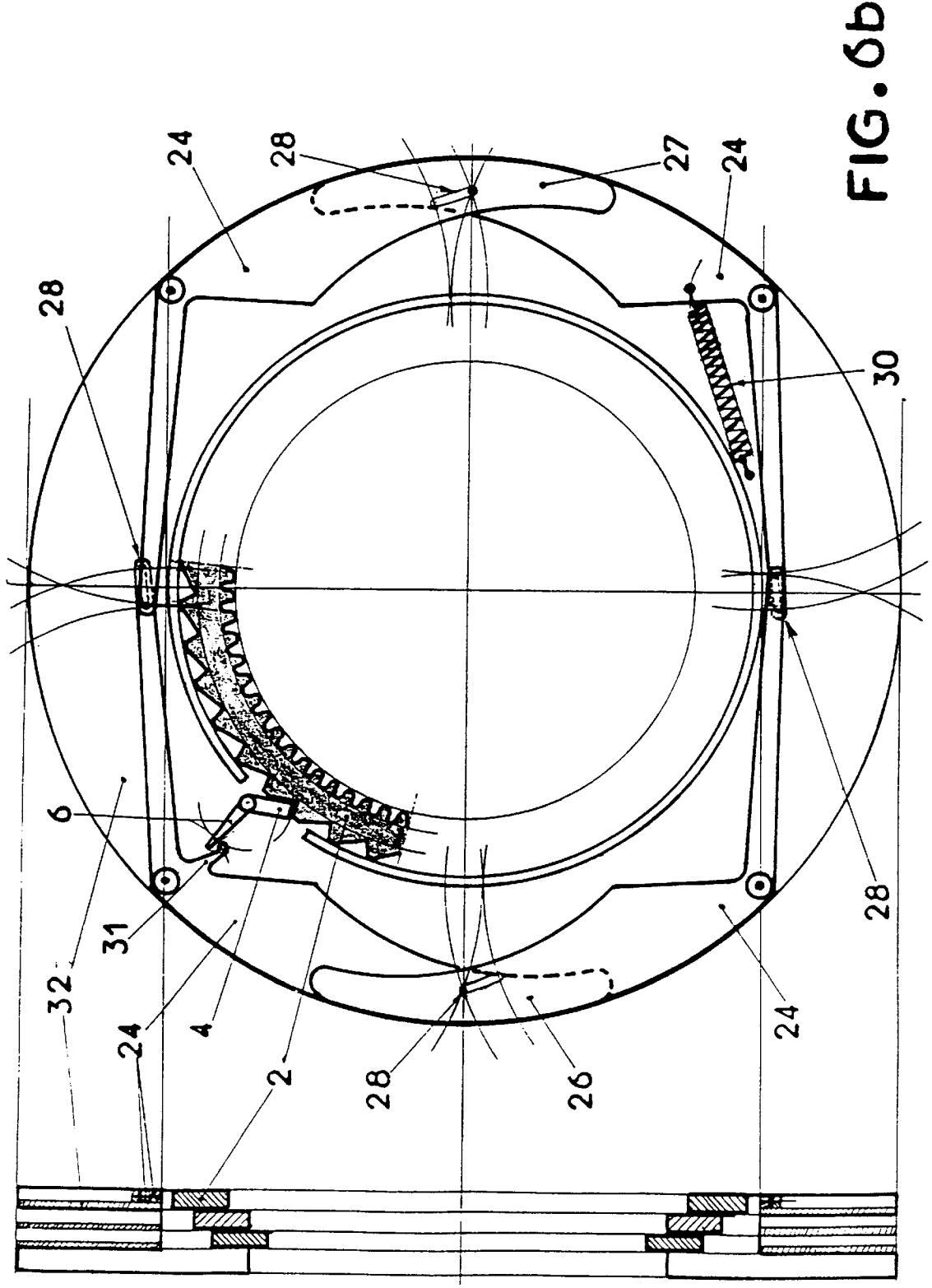

DIFFERENTIAL SELECTION AUTOMATIC GEAR CHANGE DEVICE FOR PEDAL VEHICLES

BACKGROUND OF THE INVENTION

The present invention is related to a compact automatic gear change device for a bicycle in which a first set of sprocket wheels (1) mesh with a second set of sprocket wheels (2) by means of an intermediate moving element (3), and are equipped with anti-reverse pawls automatically controlled by mechanical or electronic tachometers.

French Patent No. 2.711.351, published on Apr. 28, 1995, describes a differential selection gear change for a bicycle, based on the difference in the angular speed of the pinions, and on the utilization of anti-reverse pawls, each controlled pawl having a lug added to enable their deactivation to be controlled. The sprocket wheels are free on their axles and mesh constantly by means of an intermediate moving element. Due to the anti-reverse pawls, the sprocket wheels only rotate in one direction and cause the engagement of the highest ratios in a natural fashion by the difference in the angular speed of the sprocket wheels. The speed selection is done by lifting the pawls by means of their lug. Since very little force is necessary to lift a pawl, this device is particularly adapted to the embodiment of a fully automatic gearbox for a bicycle due to mechanical or electronic tachometers measuring the speed of the moving elements and the transmitted torque.

SUMMARY OF THE INVENTION

The object of the present invention is a device that is to provide a gear selection device that is more compact and better integrated into the bicycle. In its general form, the object invention is gear change device for pedal vehicles, and more particularly for a bicycle, in which all of the sprocket wheels providing the gear ratios mesh by means of an intermediate moving element, are freely mounted on their axle and equipped with anti-reverse pawls acting on the other wheel sides shaped like starting teeth, the pawls being equipped with a lug by means of which they are maintained outside of the path of the starting teeth. Their deactivation is obtained by the fully automatic control of a compensated mechanical tachometer or of an electronic tachometer.

A first embodiment of the invention is a line gear cluster incorporated in a sealed housing and connecting the bottom bracket spindle to the wheel spindle by completely eliminating the drive chain. A second embodiment of the invention is composed of coaxial sprocket wheels driven by three intermediate moving elements (3) positioned on the inside of the sprocket wheels, whereas the starting teeth of the first and second sets of sprocket wheels (1) and (2), the controlled and normal pawls (4) and (5) and the tachometers are placed on the outside of the sprocket wheels. The assembly is housed in two sealed housings (44) and (46) that rotate with respect to one another. This compact cylindrical device can be positioned on the wheel or on the bottom bracket and driven by a drive chain.

BRIEF DESCRIPTION OF THE DRAWINGS

The invention will be illustrated by some of its preferred embodiments, with reference to the annexed drawings, and in which:

FIG. 6b shows an open mechanical tachometer.

DETAILED DESCRIPTION OF THE PREFERRED EMBODIMENTS

Line Gearbox with Flat Housing

In this first embodiment (version), the drive chain has been completely eliminated, and the gears have been arranged on five parallel and in-line axles (I–V, FIG. 1), the first being the bottom bracket spindle and the fifth being the wheel spindle. Therefore, it is the gears of the gearbox which, in addition to ensuring the gear ratios, fulfill the role of transmitting the driving force from the bottom bracket (pedal shaft) to the wheel. They are then contained in a sealed and rigid flat housing having the shape of the gear case that is visible on certain bicycles.

Figure 1:
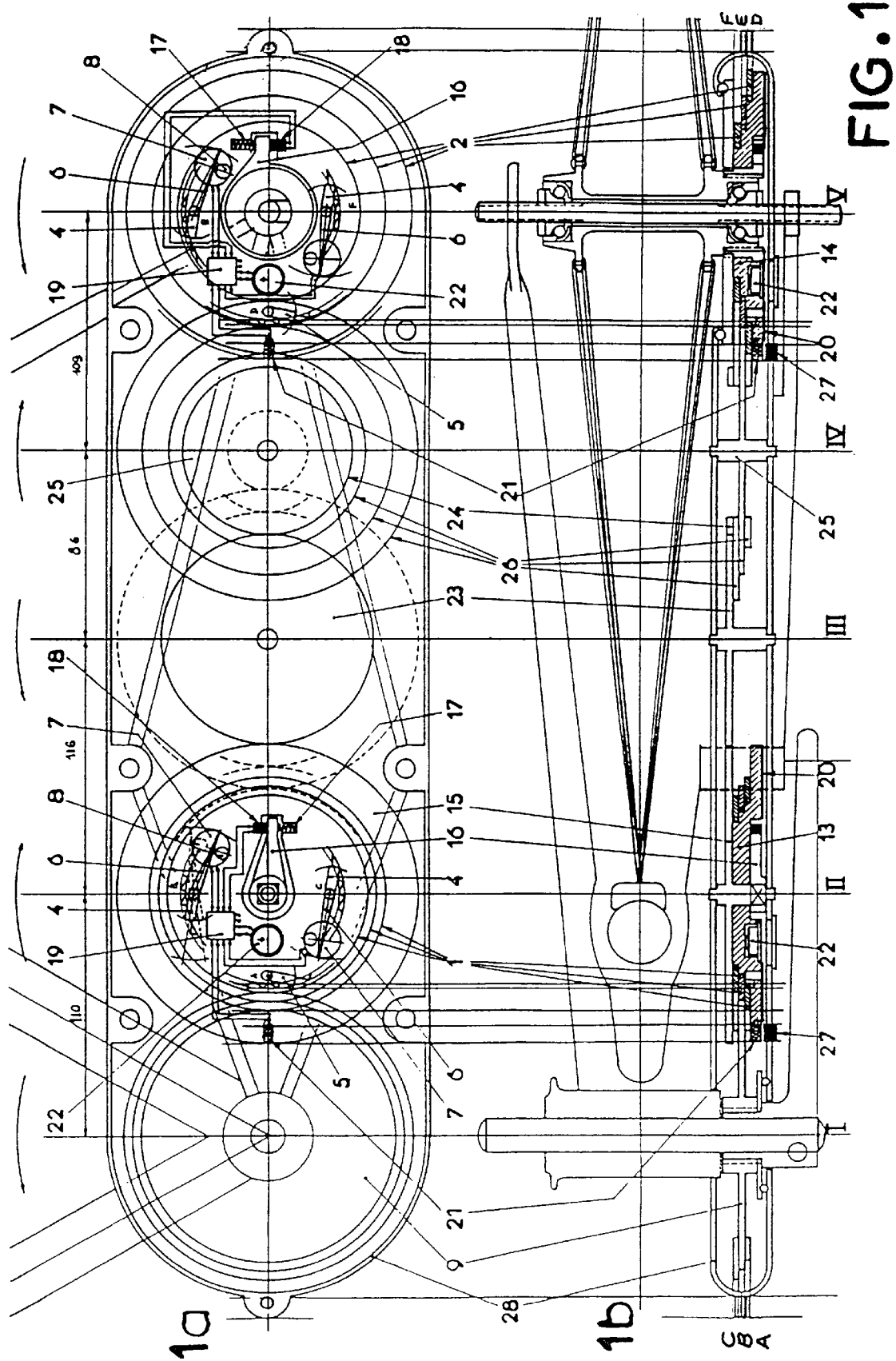
FIG. 1 shows a front view of a first embodiment of an automatic gear change device mounted between the axle of the pedal and the axle of the rear wheel of the bicycle.

In this type of automatic gearbox, it is necessary to measure the speed obtained on the driven moving element of the gears, i.e., for the bottom bracket on the intermediate moving element of the bottom bracket, and for the wheel on the axle itself of the wheel. Consequently, the mechanical or electronic tachometers with their sprocket wheels and their pawls are positioned on the second axle II and the third axle V of FIG. 1. FIG. 1 shows a device with electronic tachycouplers associated with three levels of gears A, B and C on the bottom bracket, and three levels of gears D, E, and F on the wheel, which are combined with one another to provide nine gear ratios.

On the first axle 1 of FIG. 1, a "chain" wheel (9) is composed of three toothed sprocket wheels (fixed to one another) which mesh with the three sprocket wheels (1) of the intermediate moving element of the axle II to provide the three ratios A, B and C.

On the second axle II, two controlled pawls (4) are each equipped with a lug (6), and are activated by corresponding bipolar motors (7) by means of an eccentric boss (8) driven by each bipolar motor (7). The third pawl (5) is normal and functions with the sprocket wheel providing the lowest ratio. The wheels and their corresponding pawls are mounted on a hub (13) which, in turn, is freely mounted on the axle of a toothed wheel (15). An index (16), squarely fixed on this axle, is pressed by a spring (17) against a piezo-crystal of a force meter (18). The driving force is therefore transmitted from the bottom bracket to one of the wheels (1) engaged by a selected pawl, the selected pawl transmitting the driving force to the hub (13). While rotating, the hub (13) pushes on the index (16) via the piezo-crystal force meter (18), and imparts to the piezo-crystal force meter (18) a stress that generates a variation of the current recorded by a microprocessor (19). This variation is used as a coefficient for increasing the gearshift thresholds stored in memory.

The tachometer is, for example, an electronic tachometer. The electronic tachometer includes a printed circuit (20) on which the force meter (18), the microprocessor (19), a coil of a revolution-counter sensor (21), the two bipolar motors (7) and an electric current supply battery (22) are mounted. This printed circuit (20) is fixed on the hub (13) and rotates with the hub (20). By passing in front of a permanent magnet (27) fixed on a case (28), the coil (21) generates an induced electric current and, upon each revolution, sends an impulse to the microprocessor (19). This measurement of the number of revolutions, when divided by the time measured by the timekeeper of the microprocessor, makes it possible to obtain the speed of the moving element (15). The electronic tachometer with the index (16) and spring (17) forms a tachycoupler.

On the third axle III (FIG. 1) is located a transmission moving element (23) (which replaces the function of a chain). The transmission moving element (23) meshes with the toothed wheels (15) and (24), and enables the selection of the overall ratio of the gearbox. That is, by setting different diameters for the wheels (15), (23) and (24) (such as those shown in a dotted line) the overall ratio of the gearbox may be selected.

On the fourth axle IV (FIG. 1) is located an intermediate moving element (25) on the rear wheel side, which includes, similarly to the "chain" wheel (9), of three toothed wheels (26) fixed with respect to one another, and meshing with the three sprocket wheels (2) to form the ratios D, E and F of the rear wheel.

On the fifth and last axle V (FIG. 1) one finds the same mounting of the three sprocket wheels (2) and of the corresponding pawls on the hub (14), as well as the tachycoupler on the side of the rear wheel, including a corresponding printed circuit (20) supporting components similar to those on the second axle II, already described.

To obtain uniformly distributed distances, for example from 2.73 m to 9 m, one can select the sprocket wheels and the wheels of the intermediate moving elements (IM) according to the following Table 1:

TABLE 1

Number of teeth and ratios for 9 speeds.

|   | Chain Wheel | Sprocket Wheels Bottom Bracket | Ratios |   | IM Wheel | Sprocket Wheels Wheel | Ratios |
|---|---|---|---|---|---|---|---|
| A | 114 | 106 | 1.0755 | D | 88 | 130 | 0.6769 |
| B | 122 | 98 | 1.2449 | E | 112 | 106 | 1.0566 |
| C | 130 | 90 | 1.4444 | F | 136 | 82 | 1.6585 |

By combining the three ratios A, B, C and the three ratios D, E, F, by means of the set of controlled pawls, one obtains the 9 box ratios shown in the following Table 2:

TABLE 2

Ratios, distances and speeds obtained for a change threshold at the bottom bracket selected at 60 Revs/min.

| Speeds | Ratio Box | Dist. in m. | Bottom Bracket | IM Bottom Bracket | Wheel | Km/h |
|---|---|---|---|---|---|---|
| 1st AxD | 1.3028 | 2.73 | 60.00 51.83 | −64.53 | 78.17 | 9.85 |
| 2nd BxD | 1.5080 | 3.17 | 60.00 51.71 | −74.69 | 90.48 | 11.40 |

TABLE 2-continued

Ratios, distances and speeds obtained for a change threshold at the bottom bracket selected at 60 Revs/min.

| Speeds | Ratio Box | Dist. in m. | Bottom Bracket | IM Bottom Bracket | Wheel | Km/h |
|---|---|---|---|---|---|---|
| 3rd CxD | 1.7497 | 3.67 | 60.00 51.63 | −86.67 | −104.98 | 13.23 |
| 4th AxE | 2.0335 | 4.27 | 60.00 51.83 | 64.53 | 122.01 | 15.37 |
| 5th BxE | 2.3538 | 4.94 | 60.00 51.71 | 74.69 | 141.23 | 17.79 |
| 6th CxE | 2.7311 | 5.73 | 60.00 51.34 | 86.67 | −163.87 | 20.65 |
| 7th AxF | 3.1919 | 6.70 | 60.00 51.83 | 64.53 | 191.51 | 24.13 |
| 8th BxF | 3.6947 | 7.75 | 60.00 51.71 | 74.69 | 221.68 | 27.93 |
| 9th CxF | 4.2870 | 9.00 | 60.00 | 86.67 | 257.22 | 32.41 |

In Table 2, the speed thresholds that trigger the change of ratio are indicated by an arrow, and are stored in memory in the microprocessor (19). For the bottom bracket, the speed threshold are three in number (column "Revs/min-IM.bottom bracket"), whereas for the wheel, two thresholds are sufficient (column "Revs/min-Wheel"), since there is no more change beyond the 9th speed. The thresholds indicated on the table correspond to a pedaling speed of 60 rpm (Revs/min), but it is advisable to enable the cyclist to select between several pedaling thresholds, for example, 40, 50, 60, 70 rpm (Revs/min), as a function of the cyclist's physical capacities, and to store the twenty corresponding digits in memory to enable this selection.

The functioning of this first embodiment is as follows: when the bicycle is being stopped, the tachycouplers detect a speed below 64 and 104 Revs/min, and all of the controlled pawls (4) are lifted and, therefore, deactivated. The 1st speed is therefore activated by the normal pawls (5) of each of the first and second sets of sprocket wheels which work with the sprocket wheels A and D. When the bottom bracket reaches 60 Revs/min, the corresponding tachycoupler reaches 64 Revs/min, and initiates shifting to the 2nd speed by releasing the controlled pawl (4) corresponding to the sprocket wheel B. The speed of the bottom bracket then retrogrades to 51 Revs/min. As the acceleration continues, the threshold of 74 Revs/min is reached to release the controlled pawl (4) corresponding to the wheel C. At the level of 86 Revs/min, the microprocessor (19) is programmed to lift the controlled pawls (4) corresponding to sprocket wheels B and C once again and to allow the normal pawl (5) corresponding to sprocket wheel A to work with the sprocket wheel A. However, simultaneously, the tachycoupler of the wheel reaches the threshold of 104 Revs/min, and releases the controlled pawl (4) corresponding to the sprocket wheel E, which causes shifting to the 4th speed. These different phases of operation are thus repeated up to the 9th speed.

Nevertheless, all the thresholds indicated in Table 2 have been calculated without taking the driving force into account. The force sensor (18) causes a variation of current that is proportional to the driving force. This current variation is used by the microprocessor (19) as a coefficient to increase the value of the thresholds in Table 2 both on the tachometer of the bottom bracket and on that of the wheel. Consequently, the more substantial the driving torque necessary for the propulsion, the higher the ratio shifting speeds.

The description of the in-line device of the first embodiment (FIG. 1) was made using an electronic tachometer, but it is also possible to use a mechanical tachometer, described hereinafter with respect to the second embodiment.

Compact Coaxial Automatic Gearbox

Figure 2:
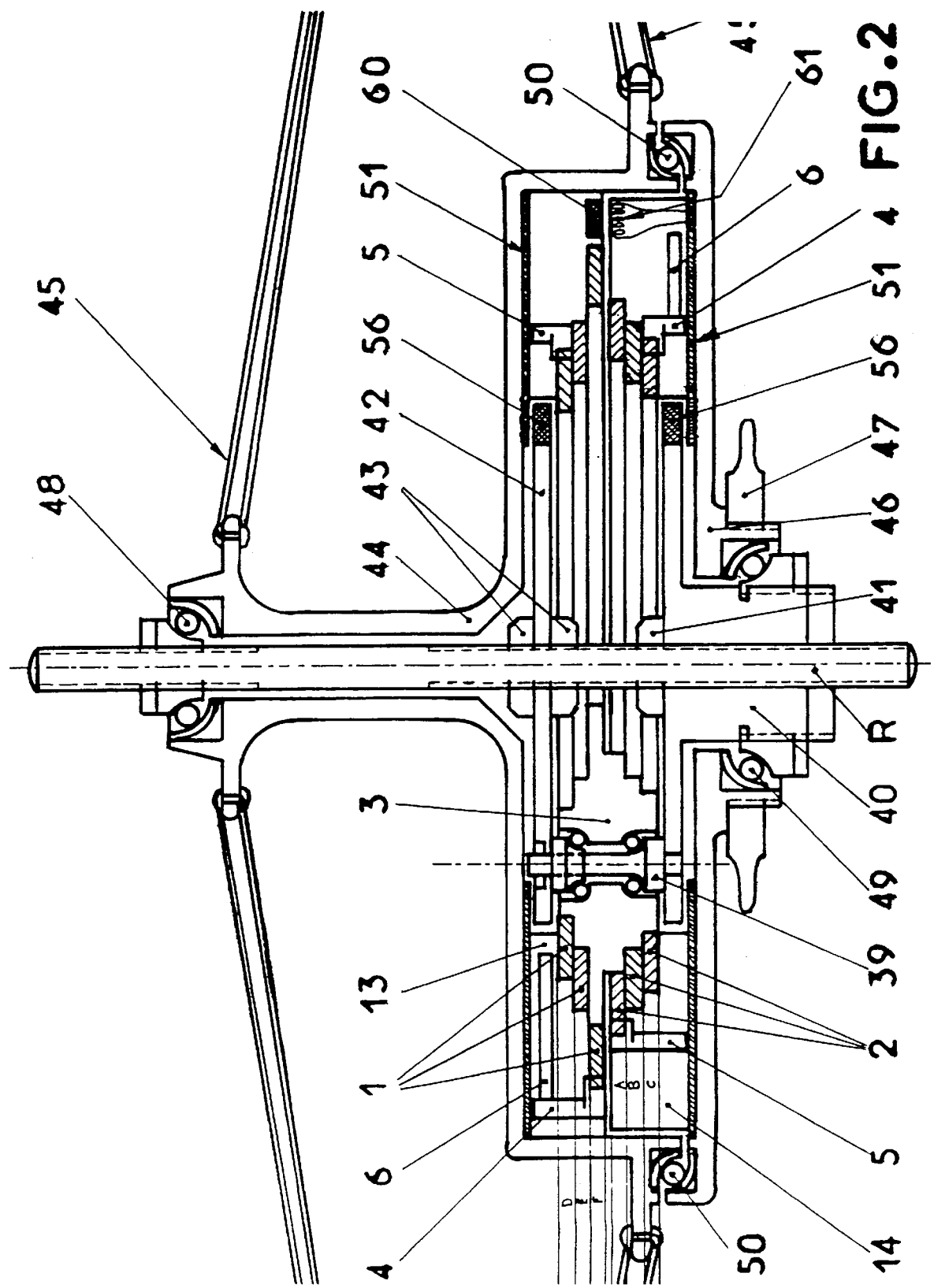
FIG. 2 shows a cross sectional top view of a second embodiment of the automatic gear change device arranged in a sealed housing, coaxial to the axle of the rear wheel of the bicycle.
Figure 3:
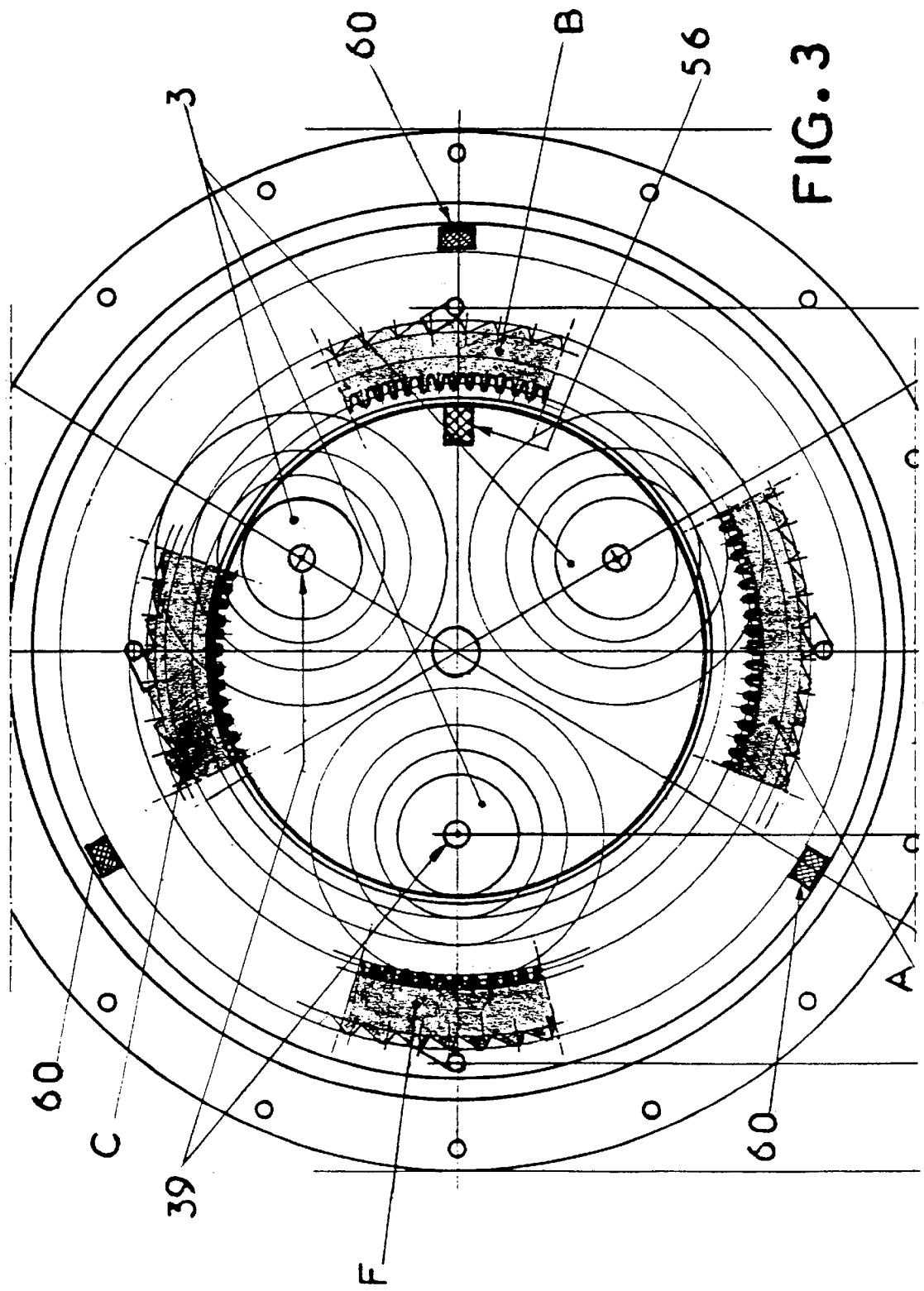
FIG. 3 shows a front view of the device of FIG. 2.

In a second embodiment shown in FIGS. 2 and 3, the intermediate moving element (3) is arranged within the first and second sets of sprocket wheels (1) and (2), all of which are coaxial to the wheel spindle so as to render the assembly more compact and more impervious. This intermediate moving element (3) is therefore much smaller than in the previous embodiment. To enable the intermediate moving element (3) to resist substantial driving torque, the intermediate moving element (3) is reproduced in three identical copies distributed about the wheel spindle. Thus, the force transmitted by each gear tooth is substantially reduced.

The first and second sets of sprocket wheels (1) and (2) are shaped with the gear teeth inward, whereas the pawl-engaging starting teeth are outward (FIG. 3). Therefore, the controlled and normal pawls (4) and (5) are arranged outside of the first and second sets of sprocket wheels (1) and (2), as well as the corresponding automatic control devices. Manual control devices seem to be spaced such that pawls would be inaccessible from the outside. Conversely, in the present case, since the hubs (13) are outside of the sets of sprocket wheels, the layout of the hubs (13) makes it possible to house the automatic control tachycouplers therein very easily, in addition to the controlled and normal pawls (4) and (5).

FIGS. 2 and 3 show a 9 speed gearbox including six sprocket wheels: a first set of 3 wheels A, B, C (1) and a second set of 3 wheels D, E, F (2). The three intermediate moving elements (3) each including six pinions stacked and affixed to one another, are mounted (with ball bearings) on three axles fixed on a flange (40). The flange (4) is screwed on the fixed axle R of the rear wheel and is engaged to the axle R a counternut (41). A second flange (42) is also engaged to the axle R by two counternuts (43) and maintains the end of the three fixed axes (39) thus forming a cage that is rigid and solidly affixed to the axle R of the wheel and of the rear fork.

Two rotating housings (44) and (46) enclose this assembly and constitute the wheel hub. The first housing (44) supports the wheel spokes (45) from its outer circumference; the hub (13) is fixed in the inner circumference of the first housing (44). The sprocket wheels (1) rotate within the hub B and the first housing (44). The second housing (46) supports, on its outer circumference, a fixed pinion (47) which receives a chain for transmitting the motive force from the bottom bracket (pedal shaft); the second hub (14) is fixed in the inner circumference, and the sprocket wheels (2) rotate within the second hub (14). The two housings (44) and (46) rotate on the wheel axle R by means of two ball bearings (48) and (49), whose ball races are opposite. Further, the two housings rotate with respect to one another by means of a large ball bearing (50).

In FIG. 3, the four sprocket wheels C, B, A and F, with their corresponding pawls, that can be seen in a plane, are partially shown in ascending order. The other two wheels D and E have not been shown in order not to overcrowd the drawing, but it is seen that the direction of the pawl F is reversed because D, E and F are driven pawls, whereas A, B and C are driving pawls. The arrangement of the three intermediate moving elements (3) is also seen in FIG. 3. The three intermediate moving elements (3) are, for the same reasons, only represented by the working diameters of the four corresponding sprocket wheels C, B, A and F.

Figure 4:
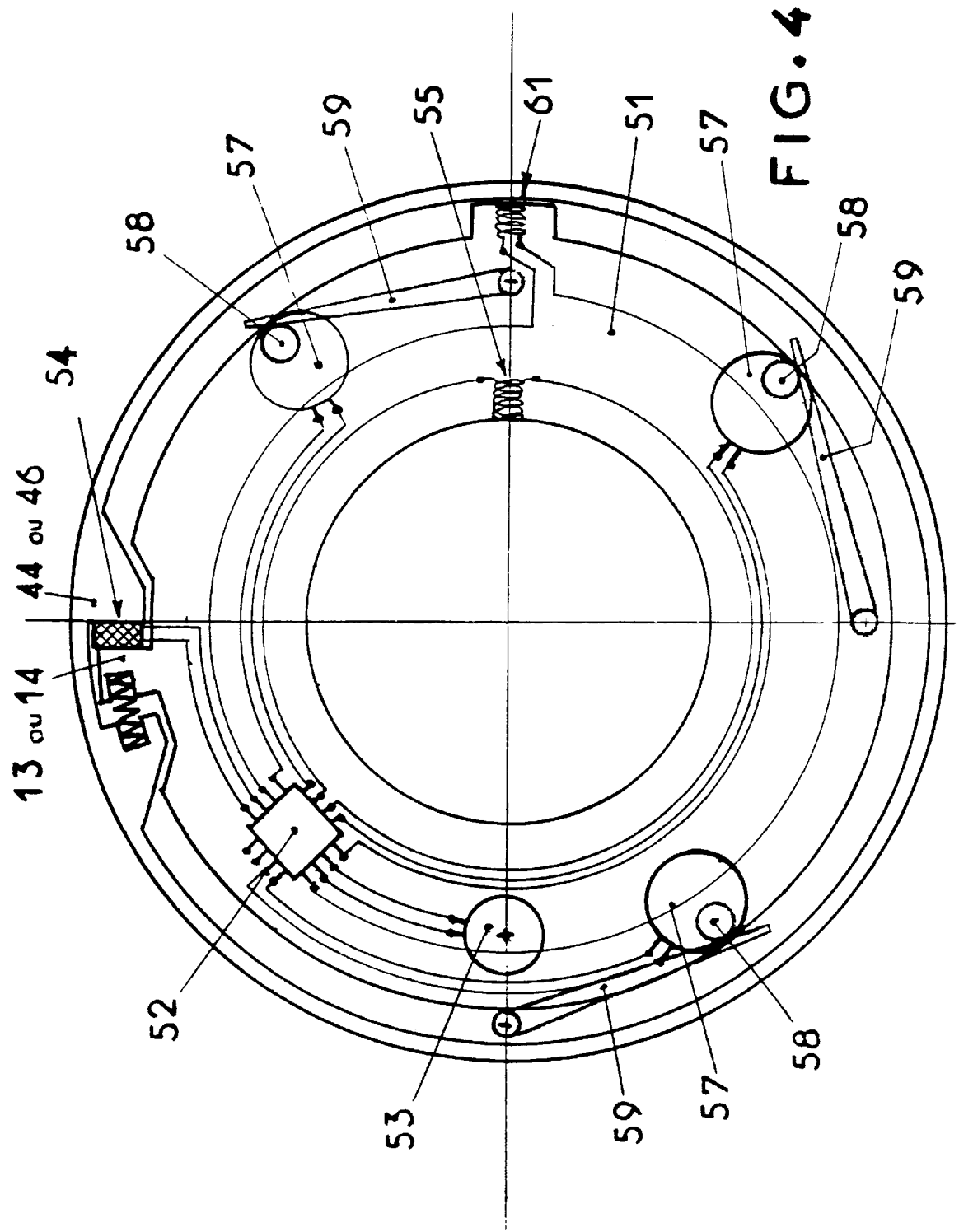
FIG. 4 shows the location of the components of the electronic tachometer that controls the embodiment shown in FIG. 2.

FIG. 4 shows a location of the components on a printed circuit (51) of the automatic control electronic tachycoupler. A microprocessor (52) is supplied by a battery (53), and receives data from the force meter (54) and from a first revolution-counter sensor (55). The permanent magnets (56) of the revolution-counter sensor (55) are shown in FIGS. 2 and 3. The microprocessor (52) distributes control impulses to three bipolar motors (57) which, through the position of the eccentric boss (58) acting on the lugs (59) of the controlled pawls (4), make it possible to activate or deactivate the controlled pawls (4).

In this very compact arrangement, it is not possible to place a tachycoupler in the intermediate moving element (3) to measure the speed of the driven gearing of the bottom bracket, as was done in the preceding embodiment. Therefore, it is positioned in the second hub (14), on the bottom bracket side, symmetrical to that located in the first hub (13), on the wheel side. However, if one thus places the revolution-counter sensor in a driving intermediate moving element, the capability of determining which of the three sprocket wheels A, B or C must be selected is lost. Therefore, it is necessary to provide the microprocessor (52) with additional information. To do this, a second revolution-counter sensor is positioned between the first hub (13), carrying three permanent magnets (60) and the second hub (14), carrying a second revolution-counter sensor coil (61). With this mounting, one obtains the relative speed of the second hub (14) with respect to the first hub (13), multiplied by three (due to the three magnets) so as to always obtain digits that are positive and greater than the speeds of the second set of sprocket wheels (2) driven by the bottom bracket.

To obtain uniformly distributed distances, for example, 2.80 m to 8 m, one can select the sprocket wheels and the wheels of the intermediate moving elements (IM) according to the following Table 3:

TABLE 3

Number of teeth and ratios for 9 speeds.

| | Sprocket Wheels Bottom Bracket | IM Bottom Bracket | Ratios | | IM Wheel | Sprocket Wheels Wheel | Ratios |
|---|---|---|---|---|---|---|---|
| A | 120 | 42 | 2.8571 | D | 21 | 99 | 0.2121 |
| B | 111 | 33 | 3.3636 | E | 33 | 111 | 0.2973 |
| C | 105 | 27 | 3.8889 | F | 63 | 141 | 0.4468 |

By combining the three ratios A, B, C of the bottom bracket and the three ratios D, E, F of the wheel, by means of the set of controlled pawls, one obtains the 9 gearbox ratios shown in the following Table 4:

TABLE 4

Ratios, distances and speeds obtained for a change threshold at the bottom bracket selected at 60 Revs/min.

| | | | | Revs/min at shift thresholds | | | |
|---|---|---|---|---|---|---|---|
| Speeds | Ratio Box | Dist. in m. | Bottom Bracket | Sprocket Wheels Bottom Bracket | Wheel | Bottom Bracket Wheel | Km/h |
| 1st AxD | 0.6061 | 2.80 | 60.00<br>50.97 | →132.0 | 80.00 | →316.00 | 10.08 |
| 2nd BxD | 0.7135 | 3.30 | 60.00<br>51.90 | 132.0 | 94.18 | →301.82 | 11.87 |
| 3rd CxD | 0.8249 | 3.81 | 60.00<br>54.27 | 132.0 | 108.89 | →287.11 | 13.72 |
| 4th AxE | 0.8494 | 3.92 | 60.00<br>50.97 | 132.0 | 112.12 | →283.88 | 14.13 |
| 5th BxE | 1.0000 | 4.62 | 60.00<br>51.90 | 132.0 | 132.00 | →264.00 | 16.63 |
| 6th CxE | 1.1562 | 5.34 | 60.00<br>54.34 | 132.0 | 152.61 | →243.39 | 19.23 |
| 7th AxF | 1.2766 | 5.90 | 60.00<br>50.97 | 132.0 | 168.51 | →227.49 | 21.23 |
| 8th BxF | 1.5029 | 6.94 | 60.00<br>51.90 | 132.0 | 198.38 | →197.62 | 25.00 |
| 9th CxF | 1.7376 | 8.03 | 60.00 | 132.0 | 229.36 | 166.64 | 28.90 |

As seen in Table 4 (column "Revs/min-bracket" between lines), when the bottom bracket reaches the speed threshold (selected in this case at 60 Revs/min) and causes the shifting to the higher ratio, the speed of the bottom bracket retrogrades from 51 to 54 Revs/min. The sprocket wheels of the bottom bracket then rotate at 132 Revs/min (in view of a chain transmission ratio of 2.2) as indicated by the first revolution-counter sensor (56) of the bottom bracket. Simultaneously, the second revolution-counter (61) provides 316 Revs/min for the 1st speed (or else 264 Revs/min for the 5th speed). It is the conjunction of these two values that indicates to the microprocessor (52) which combination of the positions of the controlled pawls (4) is to be produced. The nine thresholds that must be stored in memory are indicated by arrows.

Although the speed thresholds are sensed differently and the microprocessor acts on the speed threshold differently, this gearbox functions in substantially the same way as the preceding embodiment. When a pinion (47) is driven by the chain, the pinion (47) causes the housing (46), the hub (13) and the second set of sprocket wheels (2) to rotate. One of the sprocket wheels is engaged by the corresponding pawl and drives the intermediate moving elements (3) by the corresponding gear. The intermediate moving elements in turn drive the first set of sprocket wheels (1), but only one of the sprocket wheels of the first set of sprocket wheels (1) drives the hub (13) by the corresponding pawl that selects the desired gear ratio. The remaining sprocket wheels rotate freely or disengage according to their gear ratio. The force meters (54), positioned between the first hub (13) or second hub (14) and the corresponding first housing (44) or second housing (46), also function in the same way to modify the threshold stored in memory as a function of the driving torque.

The description of the preceding first and second embodiments was made using electronic tachometers. However, we have previously seen that the lifting of a pawl whose return spring has a force of a few grams, is sufficient to cause the desired change in the ratio. Since operation requires very little energy, it is quite possible to perform the operation automatically by a governer-type rotational speed mechanical measuring system.

Figure 6A:
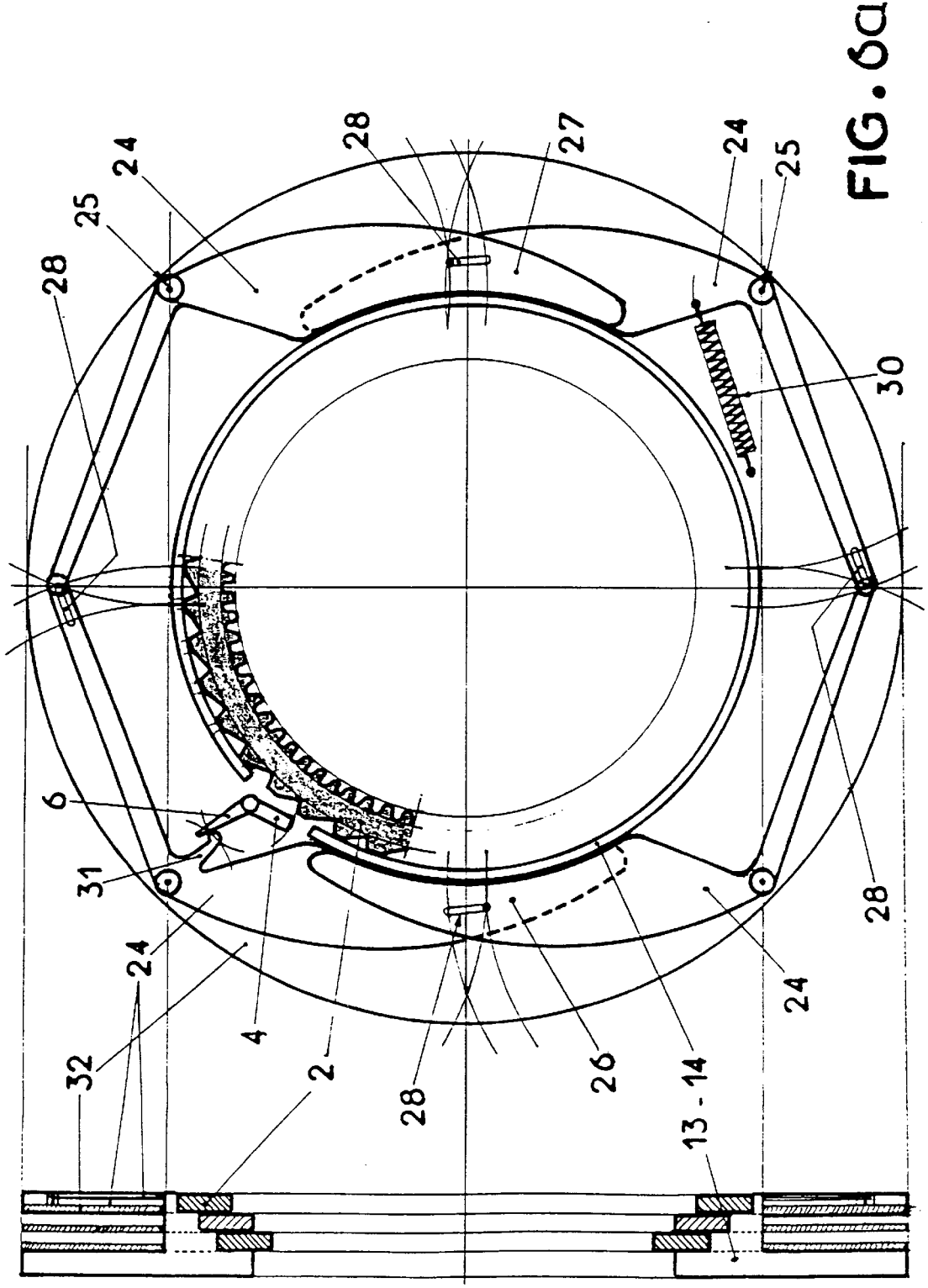
FIG. 6a shows a closed mechanical tachometer.

FIGS. 6a and 6b show a mechanical tachometer based on the principle of weights being forced apart by centrifugal force. If the mechanical tachometer is positioned directly on the moving elements whose pawls must be controlled, one obtains a simple and compact mechanism that initiates the gear shifting when the bottom bracket (pedal shaft) or the wheel have reached predetermined thresholds.

Nevertheless, since the mechanical tachometer is coaxial to the wheel spindle and therefore rotates in a vertical plane, it is necessary to eliminate the interfering forces created by this arrangement, such as: gravity, with an effect reversed at the top and bottom dead centers; bumps on the road; or sudden jamming on the brake. This tachometer includes four weights, respectively, fixed at the end of four levers (24) pivoting on the axles (25). The levers (24) are arranged such that their weights are assembled into two diametrically opposing masses (26) and (27). The levers (24) are connected to one another by four pins sliding in four slits (28), which makes it possible to obtain a simultaneous rotation of the four levers (24). The spacing of the two masses (26) and (27) under the centrifugal force imparted by rotation is therefore also simultaneous. At the same time, the effects of the interfering forces that act on each of the levers (24), but in the reverse direction, are completely eliminated.

The toothed wheels are freely mounted on the corresponding first or second hub (13 or 14) and are plumb with the corresponding tachometer. In order not to overcrowd the drawing, only a few gear teeth (2) and starting teeth are represented to show the engagement of the pawl (4) and of its lug (6) which serves as a control therefor.

The weights are returned to their rest position by a calibrated spring (30) and in this position, a corresponding finger (31) of the lever (24) lifts the lug (6) of the pawl (4) and maintains the pawl (4) outside of the path of the starting teeth of the gearing. When the tachometer reaches a sufficient speed, the inertia of the weights creates a force greater than that of the spring (30) and causes their spacing. The finger (31) then releases the lug (6) of the corresponding pawl (FIG. 6b), and allows the pawl once again to penetrate into the path of the starting teeth of the wheels (2), which reactivates the corresponding sprocket wheel. The assembly of levers and weights that has just been described is mounted on a plate (32). In FIG. 6a the tachometer is shown at rest, whereas, in FIG. 6b, it is shown opened by the centrifugal force. Of course, the orientation of the tachometer depends on whether the tachometer will be mounted on the wheel side where the wheel is driving, or on the bottom bracket side where the wheel is driven.

For a four speed gearbox, one can describe its functioning as follows: when at rest, the weights of the two tachometers being in the resting position, the controlled pawls (4) are deactivated, and the normal pawls therefore drive the lowest ratio. At the start, the wheel and the bottom bracket both have a slow rotation. Subsequently, the bottom bracket reaches a rotational speed initiating the rocking of the weights and the shifting to a higher ratio gear. As the speed of the bicycle increases, the tachycoupler is in turn activated, causing slowing down of the bottom bracket, sufficient to return to a lower ratio gear. Finally, because the pedaling speed and that of the wheel are both sufficient to maintain the weights at an outer limit, the high ratio is reached and maintained, as long as this speed can be maintained.

If the cyclist stops pedaling, while he is riding at high speed (for example, downhill), the tachometer will unnecessarily control the deactivation of the pawl of the chain wheel. However, as soon as pedaling is resumed, the bottom brackets rotational speed will exceed the threshold for reactivating the pawl of the chain wheel before pedaling becomes useful again. It is likely that the cyclist will not even notice the reactivation.

The reverse process is undertaken for the deceleration, but this time, the releasing force will occur precisely on the pawl that is engaged. If this deceleration is intentional, for example during braking, the cyclist stops pedaling, and the pawl can disengage without any difficulty. On the contrary, if the slowing down is unintentional (for example, on a hill), while the cyclist continues pedaling vigorously to avoid this slowing down, the pawl engaged in the toothing of the ratchet mechanism can remain engaged therein. Accordingly, until the pressure that is exerted on the engaged pawl is reduced sufficiently, either at the time of the passage to the dead centers of the bottom bracket, or by a voluntary and momentary release of the pressure on the pedals, the pawl remains engaged.

This remark is not specific to the mechanical tachometer, but is valid for the remaining embodiments. It should also be noted that, similarly a conventional chain gearshift system cannot transmit any thrust during the entire duration of the shifting of the chain. Shifting of the chain, however, requires much longer than the gear change of the present device.

A simplified compact device can be obtained by eliminating the tachometers and the pawls on the bottom bracket side, and by replacing the second set of sprocket wheels (2) by a single sprocket wheel with no starting teeth directly fixed on the rotating housing (46). The first set of sprocket wheels (1) on the wheel side are then the only sprocket wheels ensuring the various ratios of the gearbox, similarly to gearshifts with a single chain wheel.

Figure 5:
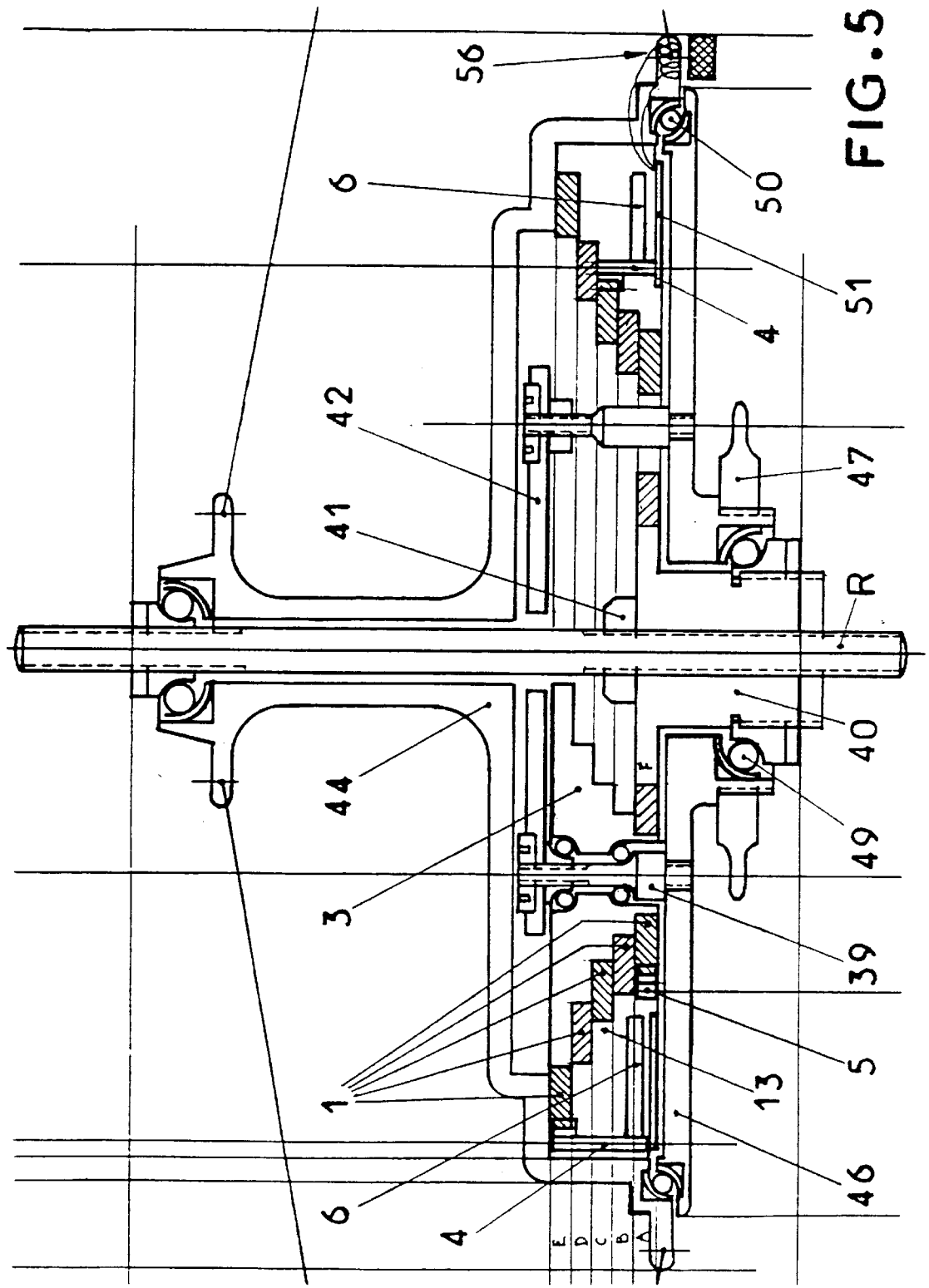
FIG. 5 is another similar, but simplified embodiment of the device of FIG. 2.

A simplified but flatter device according to a third embodiment (FIG. 5) can also be obtained by allowing the three intermediate moving elements (3) to rotate like satellites. In this case, the three intermediate moving elements (3) are fixed through their corresponding axles (39) directly on the rotating housing (46), and are thus driven in a satellite-like manner about the flange (40) fixed on the axle R. The teeth of the first gear F are provided in the flange (40). At the same level, but at a larger diameter, the sprocket wheel of the first ratio A (1) meshes with the same pinion of the satellite (3). Therefore, the thickness of one level of gearing is gained. The five sprocket wheels A, B, C, D and E that make it possible to obtain five speeds are located outside of the satellites (3). The five sprocket wheels A, B, C, D and E are supported by the hub (13) fixed in the housing (44). As previously noted, the normal pawl (5) corresponding to sprocket wheel A and the four controlled pawls (4) corresponding to sprocket wheels B, C, D and E are arranged in the first hub (13). If a mechanical automatic control is adopted which the four tachycouplers are arranged in the first hub (13), if an electronic automatic control is adopted the previously described microprocessor and its components are arranged in the first hub (13).

In this third embodiment, all of the controls on the bottom bracket side have been eliminated so as to only maintain the controls on the wheel side, which is an important simplification. On the other hand, one can only obtain five speeds with five wheels, whereas the double system makes it is possible to obtain 9 speeds with six wheels.

To obtain uniformly distributed distances, for example, 3.70 m to 8.35 m, one can select the sprocket wheels and the wheels of the intermediate moving elements (IM) according to the following Table 5:

TABLE 5

Number of teeth and ratios for 5 speeds.

| | IM Wheel | Sprocket Wheels Wheel | Ratios | | Wheel Fixed | IM Bottom Bracket | Ratios |
|---|---|---|---|---|---|---|---|
| A | 18 | 150 | 0.1200 | D | 57 | 189 | 0.3016 |
| B | 24 | 156 | 0.1538 | E | 117 | 249 | 0.4699 |
| C | 33 | 165 | 0.2000 | F | 114 | 115 | 6.3333 |

As the intermediate moving elements (3) rotate like a satellite, one obtains the five gearbox ratios presented in Table 6 below, by multiplying the ratio F by each of the ratios of the five sprocket wheels of the wheel, and by adding 1 (or (A×F)+1, then (B×F)+1, . . . etc.).

TABLE 6

Ratios, distances and speeds obtained for a shifting threshold at the bottom bracket selected at 60 Revs/min.

| | | | Revs/min at shift thresholds | | |
|---|---|---|---|---|---|
| Speed | Ratios Box | Dist. in m. | Bottoms Bracket | Wheel | Km/h |
| 1st (AxF) + 1 | 1.7600 | 3.70 | 60.00 53.49 | −45.60 | 5.75 |
| 2nd (SxF) + 1 | 1.9744 | 4.15 | 60.00 52.26 | −58.46 | 7.37 |
| 3rd (CxF) + 1 | 2.2667 | 4.76 | 60.00 46.73 | −76.00 | 9.58 |
| 4th (DxF) + 1 | 2.9101 | 6.11 | 60.00 43.92 | −114.60 | 14.44 |
| 5th (ExF) + 1 | 3.9759 | 8.35 | 60.00 | 178.55 | 22.50 |

As seen in Table 6 (between lines, column "Revs/min-bracket") that the speed of about 53 Revs/min (at which the bottom bracket retrogrades from 60 Revs/min after shifting to the higher ratio) is more substantial than previously because there are only five speeds. Four shifting thresholds are necessary and are indicated by arrows (column "Revs/min-Wheel"). If this device is equipped with mechanical tachycouplers, it will be necessary to provide four mechanical tachycouplers, one for each of the thresholds. If the electronic device is used, a tachycoupler equipped with four bipolar magnet motors is necessary.

A variation on this type of compact coaxial gearbox, whether according to the second or third embodiments, consists of mounting the coaxial gearbox on the bottom bracket spindle, the drive chain then being positioned between the box and the wheel. One of the pedals is fixed on the driving housing, affixed on the bottom bracket spindle by a conventional key. At the same time, the driven housing supports the chain wheel that receives a chain for transmitting the driving force toward a fixed pinion positioned on the wheel. The flange (40) that supports the three fixed intermediate moving elements (or which is shaped like a toothed wheel F when the intermediate moving elements work as satellites as in the third embodiment) is firmly affixed to the fixed hub of the bottom bracket.

The different tables and devices described, by way of non-limiting examples, illustrate certain possibilities of application of the invention, but it is obvious that other calculations for the gearbox, or other embodiments or combinations of these systems can be envisioned.

I claim:

1. A gear change device for pedal vehicles, comprising:
a first gear driven by a pedal rotatably mounted on a first axle, said first axle being a bottom bracket spindle;
a first intermediate gear rotatably mounted on a second axle;
a first series of sprocket wheel for providing gear ratios, each sprocket wheel of said first series of sprocket wheels having sprocket teeth on a first circumference and starting teeth on a second circumference, said first series of sprocket wheels being freely rotatably supported by said first intermediate gear, and sprocket teeth of said first series of sprocket wheels engaging said first gear;
a first pawl and at least one second pawl mounted on said first intermediate gear for acting on said starting teeth of said first series of sprocket wheels, said at least one second pawl having a corresponding lug for disengaging said at least one second pawl to a position outside of a path of said starting teeth of said first series of sprocket wheels;
a second intermediate gear engaging said first intermediate gear and mounted on a third axle;
a third intermediate gear engaging said second intermediate gear and mounted on a fourth axle;
a final drive gear rotatably mounted on a fifth axle said fifth axle being a wheel spindle;
a second series of sprocket wheel for providing gear ratios, each sprocket wheel of said second series of sprocket wheels having sprocket teeth on a first circumference and starting teeth on a second circumference, said second series of sprocket wheels being freely rotatably supported by said final drive gear, and sprocket teeth of said second series of sprocket wheels engaging said third intermediate gear;
a third pawl and at least one fourth pawl mounted on said final drive gear for acting on said starting teeth of said second series of sprocket wheels, said at least one fourth pawl having a corresponding lug for disengaging said at least one fourth pawl to a position outside of a path of said starting teeth of said second series of sprocket wheels;
a first tachometer device, positioned on the first intermediate gear, for automatically controlling said disengaging of said at least one second pawl to said position outside of said path of said starting teeth of said first series of sprocket wheels; and
a second tachometer device, positioned on the final drive gear, for automatically controlling said and said disengaging of said at least one fourth pawl to said position outside of said path of said starting teeth of said second series of sprocket wheels.

2. A gear change device for pedal vehicles, comprising:
a wheel axle;
a first hub and a second hub rotatably supported by said wheel axle;
a first plurality of sprocket wheels and a second plurality of sprocket wheels for providing gear ratios, each sprocket wheel being coaxial to said wheel axle, each sprocket wheel having sprocket teeth on an inner circumference and starting teeth on an outer circumference, each sprocket wheel being freely rotatable about said wheel axle, and each sprocket wheel corresponding to one of a normal pawl and a controlled pawl acting on said starting teeth, each of said controlled pawls having a lug for disengaging said controlled pawl to a position outside of a path of starting teeth of a corresponding sprocket wheel, wherein each of said normal pawls and each of said controlled pawls are supported by one of said first hub and said second hub;
at least one intermediate gear for meshing said first plurality of sprocket wheels with said second plurality of sprocket wheels, said at least one intermediate gear being positioned within said sprocket wheels;
a tachometer system corresponding to each of said pluralities of sprocket wheels for automatically controlling said disengaging of said controlled pawls, each of said tachometer systems being supported by one of said first hub and said second hub.

3. The gear change device according to claim 2, further comprising:
a flange affixed to said wheel axle;
wherein said at least one intermediate gear comprises three identical intermediate gears distributed within said first plurality of sprocket wheels and within said second plurality of sprocket wheels, said three identical intermediate gears being rotatably supported by three corresponding axles affixed to said flange, in order to enable the device to withstand driving torque.

4. The gear change device according to claim 2, wherein:
said first hub comprises a first rigid housing and said second hub comprises a second rigid housing, said first rigid housing and said second rigid housing rotating with respect to one another and forming a sealed case that houses the gear change device;
said first plurality of sprocket wheels is freely rotatably supported within said first hub, said second plurality of sprocket wheels being freely rotatably supported within said second hub;
said first rigid housing supports said tachometer system corresponding to said first plurality of sprocket wheels, and said first hub supports said normal pawl and each of said controlled pawls for acting on said starting teeth of said first plurality of sprocket wheels;
said second rigid housing supports said tachometer system corresponding to said second plurality of sprocket wheels, and said second hub supports said normal pawl and each of said controlled pawls for acting on said starting teeth of said second plurality of sprocket wheels;
said first rigid housing and said second rigid housing are pushed toward one another by respective ball bearings having opposing races for eliminating backlash; and
said first rigid housing and second rigid housing engage via a large ball bearing.

5. The gear change device according to claim 2, further comprising:
a fixed plate mounted to said second hub, wherein said tachometer system corresponding to said second plurality of sprocket wheels is an electronic tachometer system, said electronic tachometer system comprising:
a first revolution-counter for measuring an absolute speed of said second hub with respect to said fixed plate;
a second revolution-counter for measuring a relative speed of said second hub with respect to said first hub; and
a microprocessor, said microprocessor controlling said disengaging of said controlled pawls corresponding to each of said pluralities of sprocket wheels in accordance with said first revolution-counter and said second revolution-counter.

6. The gear change device according to claim 2, wherein:

said gear change device drives a wheel, each of said tachometer systems being a mechanical tachometer system, said mechanical tachometer systems comprising:

four levers pivoting in a plane perpendicular to said wheel;

four diametrically opposite weights mounted on said levers;

four pins connecting said levers to one another such that said four weights simultaneously approach or recede from a center of rotation of said wheel, thereby eliminating all interfering forces not connected to centrifugal force generated by said weights.

7. The gear change device according to claim 4, wherein:

said gear change device drives a rear wheel of a bicycle and is mounted on a wheel spindle of said rear wheel;

said first rigid housing supports spokes of said rear wheel;

said second rigid housing supports a fixed pinion for receiving a chain for driving said gear change device; and said first rigid housing and said second rigid housing constituting a hub of said rear wheel.

8. A gear change device for pedal vehicles, comprising:

a wheel axle;

a first hub and a second hub rotatably supported by said wheel axle;

a plurality of driven sprocket wheels for providing gear ratios, each driven sprocket wheel being coaxial to said wheel axle, each driven sprocket wheel having sprocket teeth on an inner circumference and starting teeth on an outer circumference, each driven sprocket wheel being freely rotatable about said wheel axle, and each driven sprocket wheel corresponding to one of a normal pawl and a controlled pawl acting on said starting teeth, each of said controlled pawls having a lug for disengaging said controlled pawl to a position outside of a path of starting teeth of a corresponding driven sprocket wheel, wherein each of said normal pawls and each of said controlled pawls are supported by said first hub;

a driving sprocket wheel, coaxial to said wheel axle, freely rotatable about said wheel axle, fixed with respect to said second hub and having sprocket teeth on an inner circumference at least one intermediate gear for meshing said plurality of driven sprocket wheels with said driving sprocket wheel, said at least one intermediate gear being positioned within said plurality of driven sprocket wheels and said driving sprocket wheels;

a tachometer system for automatically controlling said disengaging of said controlled pawls, said tachometer systems being supported by said first hub.

9. The gear change device according to claim 8, further comprising:

a toothed flange affixed to said wheel axle;

wherein said at least one intermediate gear comprises three identical intermediate gears distributed within said plurality of driven sprocket wheels and within said driving sprocket wheels;

wherein said three identical intermediate gears are satellite gears rotatably supported by three corresponding axles fixed with respect to said second hub, engaging said toothed flange and said plurality of driven sprocket wheels and transmitting a driving force to said plurality of driven sprocket wheels.

10. A gear change device for pedal vehicles, comprising:

a wheel axle;

a first hub rotatably supported by said wheel axle;

a second hub rotatably supported by said wheel axle;

a first series of sprocket wheels for providing gear ratios, each sprocket wheel of said first series of sprocket wheels being coaxial to said wheel axle and having sprocket teeth on an inner circumference and starting teeth on an outer circumference, said first series of sprocket wheels being freely rotatable about said wheel axle;

a second series of sprocket wheels for providing gear ratios, each sprocket wheel of said second series of sprocket wheels being coaxial to said wheel axle and having sprocket teeth on an inner circumference and starting teeth on a outer circumference, said second series of sprocket wheels being freely rotatable about said wheel axle;

an intermediate gear for associating said first series of sprocket wheels with said second series of sprocket wheels, said intermediate gear being positioned within said first series of sprocket wheels and said second series of sprocket wheels;

a first pawl and at least one second pawl for acting on said starting teeth of a corresponding sprocket wheel of each of said series of sprocket wheels, said at least one second pawl having a corresponding lug for disengaging said at least one second pawl to a position outside of a path of said starting teeth of said corresponding sprocket wheel of said series of sprocket wheels, said first pawl and said at least one second pawl being supported by a corresponding one of said first hub and said second hub;

a tachometer system corresponding to each of said at least one second pawl, each of said tachometer systems automatically controlling said disengaging said corresponding at least one second pawl to said position outside of said path of said starting teeth of said corresponding one of said series of sprocket wheels, each of said tachometer systems being supported by a corresponding one of said first hub and said second hub.

11. A gear change device for pedal vehicles, comprising:

a first series of sprocket wheels for providing gear ratios, each sprocket wheel of said first series of sprocket wheels having sprocket teeth on a first circumference and starting teeth on a second circumference, said first series of sprocket wheels being freely rotatable;

a second series of sprocket wheels for providing gear ratios, each sprocket wheel of said second series of sprocket wheels having sprocket teeth on a first circumference and starting teeth on a second circumference, said second series of sprocket wheels being freely rotatable;

a first pawl and at least one second pawl for acting on said starting teeth of a corresponding one of each of said series of sprocket wheels, said at least one second pawl having a corresponding lug for disengaging said at least one second pawl to a position outside of a path of said starting teeth of said corresponding one of said series of sprocket wheels, at least one intermediate gear for associating said first series of sprocket wheels with said second series of sprocket wheels; and a tachometer device for automatically controlling said disengaging of each of said at least one second pawls to said position outside of said path of said starting teeth of said corresponding one of said series of sprocket wheels.

12. A gear change device for pedal vehicles, comprising:

a first gear driven by a pedal, said pedal rotatably mounted on a first axle, said first axle being a bottom bracket spindle;

a first sprocket wheel support gear, being rotatably mounted;

a first series of sprocket wheels for providing gear ratios, each sprocket wheel of said first series of sprocket wheels having sprocket teeth on a first circumference and starting teeth on a second circumference, said first series of sprocket wheels being freely rotatably supported to engage said first sprocket wheel support gear;

a first pawl and at least one second paw: mounted on said first sprocket wheel support gear for acting on said starting teeth of said first series of sprocket wheels,, said first pawl being an anti-reverse pawl engaging a lowest gear ratio sprocket wheel of said first series of sprocket wheels, said at least one second pawl having a corresponding lug for disengaging said at least one second pawl to a position outside of a path of said starting teeth of said first series of sprocket wheels;

an intermediate gear assembly, said sprocket teeth of said first series of sprocket wheels engaging one of said first gear and said intermediate gear assembly, and said first sprocket wheel support gear coupled to the remaining one of said first gear and said intermediate gear assembly, so that driving of said first gear is transmitted to said intermediate gear assembly;

a final drive gear rotatably mounted on a wheel spindle;

a second series of sprocket wheels for providing gear ratios, each sprocket wheel of said second series of sprocket wheels having sprocket teeth on a first circumference and starting teeth on a second circumference, said second series of sprocket wheels being freely rotatably supported by said final drive gear, and sprocket teeth of said second series of sprocket wheels engaging said intermediate gear assembly;

a third pawl and at least one fourth pawl, mounted on said final drive gear, for acting on said starting teeth of said second series of sprocket wheels, said third pawl being an anti-reverse pawl engaging a lowest gear ratio sprocket wheel of said second series of sprocket wheels, and said at least one fourth pawl having a corresponding lug for disengaging said at least one fourth pawl to a position outside of a path of said starting teeth of said second series of sprocket wheels;

at least one first tachometer device, positioned on said first sprocket wheel support gear, that controls said disengaging of said at least one second pawl to said position outside of said path of said starting teeth of said first series of sprocket wheels; and at least one second tachometer device, positioned on said final drive gear, that controls said and said disengaging of said at least one fourth pawl to said position outside of said path of said starting teeth of said second series of sprocket wheels, said at least one first tachometer device and said at least one second tachometer device thereby together controlling transmission of driving force from said first gear to said final drive gear in a plurality of gear ratios.

13. The gear change device for pedal vehicles according to claim 12, wherein said at least one first tachometer device and said at least one second tachometer device together detect a relative rotating speed of said first sprocket wheel support gear and said final drive gear, and wherein said at least one first tachometer device and said at least one second tachometer device together controlling transmission of driving force from said first gear to said final drive gear in a plurality of gear ratios in accordance with a predetermined relationship between said plurality of gear ratios and said detected relative rotating speed.

14. The gear change device for pedal vehicles according to claim 13, further comprising a transducer that directly measures driving force applied with respect to said pedal, and wherein said at least one first tachometer device and said at least one second tachometer device together control transmission of driving force from said first gear to said final drive gear in a plurality of gear ratios in accordance with a predetermined relationship between said plurality of gear ratios, said detected relative rotating speed, and said directly measured driving force.

15. The gear change device for pedal vehicles according to claim 12, each of said at least one first tachometer device and said at least one second tachometer device comprising a revolving permanent magnet and a coil for detecting revolutions of said permanent magnet.

* * * * *